Sept. 29, 1936.　　　　G. P. LOOMIS　　　　2,055,797
INNER TUBE FOR TIRES
Filed Jan. 23, 1934
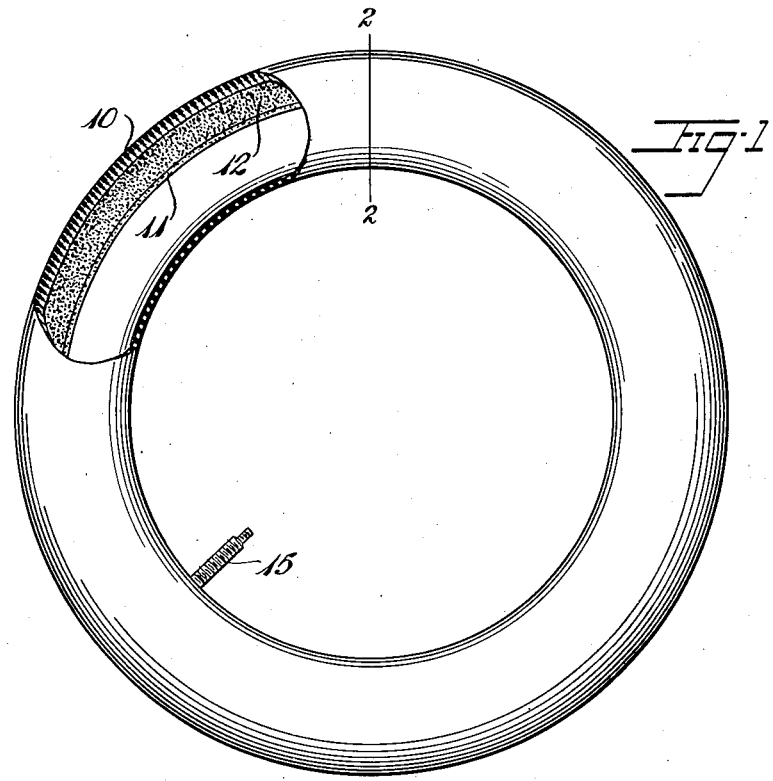
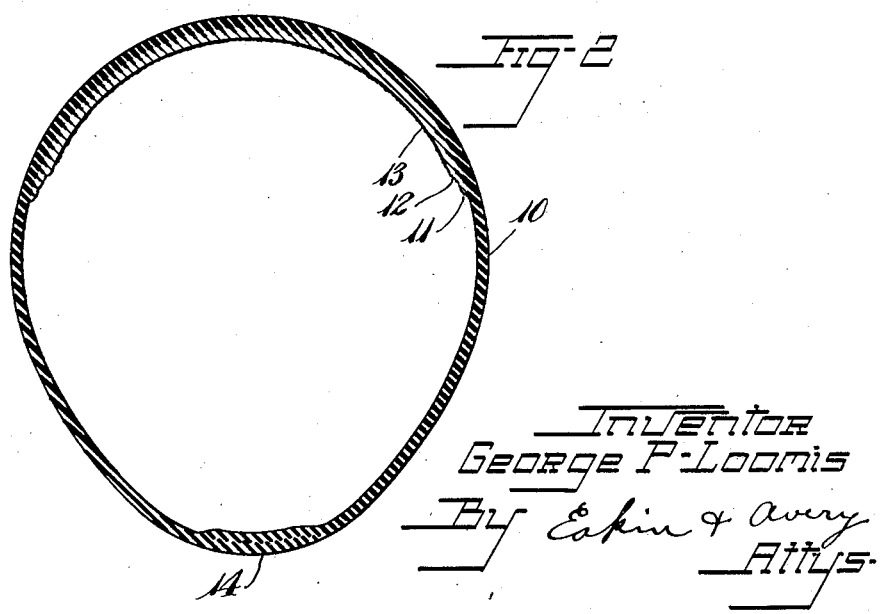

Patented Sept. 29, 1936

2,055,797

UNITED STATES PATENT OFFICE 2,055,797

INNER TUBE FOR TIRES

George P. Loomis, Silver Lake Village, Ohio, assignor to The B. F. Goodrich Company, New York, N. Y., a corporation of New York Application January 23, 1934, Serial No. 707,900

4 Claims. (Cl. 152—13)

This invention relates to puncture-sealing inner tubes for tires and its chief objects are to provide for dependable self-sealing of punctures or other apertures and to provide a dependable self-sealing inner tube at moderate expense. More specific objects are to avoid cracking or other deterioration of the self-sealing composition, to provide lightness of construction and to avoid migration of the self-sealing composition toward the outer periphery of the tube as the result of centrifugal force.

I attain these objects in the preferred practice of my invention by providing on the inner face of a tube of vulcanized rubber a layer of a relatively non-flowing self-sealing composition sufficiently thin to be readily flexible and to be in all of its parts so close to the vulcanized rubber wall of the tube that the flow-inducing couple represented by centrifugal force as one element and adhesion to the vulcanized wall as the other element is of very short moment arm, the centrifugal force thus being chiefly or largely sustained by resistance to shear, and providing on the radially inner face of this layer a similarly thin layer of a more plastic or softer composition which accordingly is less subject to cracking and by reason of its thinness, like the first layer, is highly resistant to displacement by centrifugal force, and, by reason of its soft consistency, is adapted to flow into any apertures, crevices or cracks that may occur in the adjacent layer and to seal the same.

Preferably the inner surface of the last-mentioned, inner layer is coated with an adhesion-preventing material to prevent it from sticking to itself when the tube is collapsed.

Of the accompanying drawing:

Fig. 1 is a side elevation, with a portion sectioned and broken away, of an inner tube embodying and made in accordance with my invention in its preferred form.

Fig. 2 is a section on line 2—2 of Fig. 1.

Referring to the drawing, the tube of vulcanized rubber is designated 10. Next within it, in the tread portion, is the layer of relatively non-flowing self-sealing composition, designated 11. Next within that is the layer of relatively soft self-sealing composition, designated 12, and inside of that is the coating of adhesion-preventing material, designated 13.

Each of the layers 11 and 12, with employment of suitable compositions, is preferably of a thickness of not much more than .075 of an inch and the layer 13 may be as thin as is consistent with its performing its adhesion-preventing function.

Various compositions having the desired characteristics can be employed satisfactorily for the layer 11, 12, or 13.

The composition which I prefer to use for the layer 11 is a milled mixture of the following ingredients in the indicated proportions by weight:

Amber crepe rubber washed, vacuum-softened and for 15 minutes masticated____ 17.61
Amber crepe rubber washed_____ 15.03
Pale neutral (non-acidic and non-alkaline) mineral oil_____ 15.03
Light gravity, highly adhesive reclaim rubber such as inner-tube reclaim_____ 43.51
No. 2 smoked sheet rubber_____ 1.56
Anti-oxidant _____ .52
Mineral rubber_____ 4.15
Stannous chloride_____ 1.56
Palm oil_____ 1.03

The preferred composition for the layer 12 is a milled mixture of the following ingredients in the indicated proportions by weight:

Amber crepe rubber washed, vacuum dried and for 15 minutes masticated_____ 83.19
Light gravity, highly adhesive reclaim rubber such as inner-tube reclaim_____ 8.85
No. 2 smoked sheet rubber_____ 5.31
Anti-oxidant _____ 1.77
Stannous chloride_____ .88

The function of the vacuum softened amber crepe rubber is to provide adequate plasticity and adhesiveness as well as body for the composition.

The function of the amber crepe rubber that is washed but not preliminarily plasticized by vacuum drying and mastication is to provide body and to serve as a vehicle for the admixing of the neutral oil.

The function of the neutral oil is that of a softener or plasticizer.

The function of the inner-tube reclaim is to prevent excessive flowability and to provide adhesiveness.

The function of the No. 2 smoked sheet rubber is to provide a vehicle for the admixing of the anti-oxidant.

The anti-oxidant of course serves to delay oxidation or deterioration of the composition.

The function of the mineral rubber is that of a plasticizer and is found to be desirable for improving the calendering characteristics of the composition.

The stannous chloride serves to retard migration of sulphur from the vulcanized rubber wall of the inner tube into the self-sealing compositions and thus to prevent excessive vulcanization of the latter.

The palm oil serves as a softener and improves the calendering characteristics of the composition.

For the adhesion preventing layer 13 I preferably employ a nitro-cellulose lacquer, as it provides a fairly tough, continuous, and somewhat elastic film, but other adhesion preventing film-forming substances, or powdered materials, can be employed.

In order conveniently to provide the self-sealing layers of suitable thinness the two self-sealing compositions preferably are individually sheeted out and then plied together on a calender and the composite sheet is then applied to the face of the sheeted stock of the tube body 10 while it is in a flat and unvulcanized condition, the adhesion-preventing layer being applied either before or after the assembling of the self-sealing compositions with the layer 10, and being allowed to dry if it is of a character such as to require drying.

The base layer 10 is then brought to closed tube form and seamed, as at 14, and the resulting article is vulcanized in a mold under internal fluid pressure, the usual valve-stem 15 being applied in accordance with the usual or preferred practice, and the resulting final product being as shown in the drawing.

Various modifications are possible within the scope of the invention as defined in the appended claims.

I claim:

1. A tire tube comprising a wall of vulcanized rubber and, within it and adhered to it, a layer of a self-sealing composition of relatively stiff consistency in a region near the vulcanized rubber wall and of less stiff consistency in a region more remote from the vulcanized rubber wall, the self-sealing composition comprising within it an ingredient adapted to retard migration of sulphur from the vulcanized rubber into the self-healing composition.

2. A tire tube comprising a rubber wall and on the inner face there of a layer of self-sealing composition having substantially no anchorage against displacement by centrifugal force other than its adhesion to the rubber wall, said layer being so thin that the centrifugal force thereof in the use of the tire is not effective to displace the composition objectionably, the self-sealing composition comprising softened, unvulcanized rubber and an ingredient adapted to retard migration of sulphur from the vulcanized rubber into the self-healing composition.

3. A tire tube comprising a rubber wall and on the inner face thereof a layer of self-sealing composition having substantially no anchorage against displacement by centrifugal force other than its adhesion to the rubber wall, said layer being so thin that the centrifugal force thereof in the use of the tire is not effective to displace the composition objectionably, the self-sealing composition comprising within it an ingredient adapted to detard migration of sulphur from the vulcanized rubber into the self-healing composition.

4. A tire tube comprising a vulcanized rubber wall and within it a layer of self-sealing composition not substantially more than two-tenths of an inch thick and only sufficiently stiff to resist centrifugal flow in service, said self-sealing composition being in two layers of different stiffness, and each about .075" thick, with the stiffer layer the nearer to the vulcanized rubber wall.

GEORGE P. LOOMIS.